US006266668B1

(12) United States Patent
Vanderveldt et al.

(10) Patent No.: US 6,266,668 B1
(45) Date of Patent: *Jul. 24, 2001

(54) SYSTEM AND METHOD FOR DYNAMIC DATA-MINING AND ON-LINE COMMUNICATION OF CUSTOMIZED INFORMATION

(75) Inventors: Ingrid V. Vanderveldt, Austin, TX (US); Christopher Lee Black, Andersonville, TN (US)

(73) Assignee: Dryken Technologies, Inc., Knoxville, TN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/366,590

(22) Filed: Aug. 4, 1999

Related U.S. Application Data

(60) Provisional application No. 60/095,308, filed on Aug. 14, 1998.

(51) Int. Cl.[7] .................................................. G06F 17/30
(52) U.S. Cl. ................................ 707/10; 707/100; 706/15
(58) Field of Search ........................ 707/10, 100; 706/12, 706/14, 15, 16

(56) References Cited

U.S. PATENT DOCUMENTS

| 5,408,655 | * | 4/1995 | Oren et al. ............................. 707/501 |
| 5,446,891 | * | 8/1995 | Kaplan et al. ............................ 707/2 |
| 5,623,652 | * | 4/1997 | Vora et al. ............................. 707/10 |

(List continued on next page.)

FOREIGN PATENT DOCUMENTS

WO 96/23265 * 8/1996 (WO) .............................. G06F/17/30

OTHER PUBLICATIONS

Klemettinen et al, "Finding interesting rules from large data sets of discovered association rules", CIKM ACM pp 401–407, Mar. 1994.*
Buntine et al, "Towards automated synthesis of datamining program", ACM KDD pp 372–376, Jul. 1999.*
Hajjar et al, "Integrating neural networks with special purpose simulation", Pro. of winter simulation conf. pp 1325–1332, 1998.*
Potts, "Generalized additive neural networks", ACM KDD pp 194–200, Jul. 1999.*
Dreilinger et al, "Experiences with Selecting Search Engines using Metasearch", ACM Trans. Inf. Syst. 195–222 (Jul. 1997).*
Rao et al., "System Components for Embedded Information Retrieval from Multiple Disparate Information Sources", Proc. of the Sixth Annual ACM Symp. on User Interface Software and Technology 23–33 (1993).*

(List continued on next page.)

*Primary Examiner*—Mark R. Powell
*Assistant Examiner*—Anil Khatri
(74) *Attorney, Agent, or Firm*—Christopher J. Rourk; Akin Gump Strauss Hauer & Feld, L.L.P.

(57) ABSTRACT

A method and system for dynamically searching databases in response to a query is provided by the present invention. More specifically, a system and method for dynamic datamining and on-line communication of customized information. This method includes the steps of first creating a search-specific profile. This search-specific profile is then input into a data-mining search engine. The data-mining search engine will mine the search-specific profile to determine topic of interests. These topics of interest are output to at least one search tool. These search tools match the topics of interest to at least one destination data site wherein the destination data sites are evaluated to determine if relevant information is present in the destination data site. Relevant information is filtered and presented to the user making the inquiry.

33 Claims, 4 Drawing Sheets

U.S. PATENT DOCUMENTS

| | | | | |
|---|---|---|---|---|
| 5,634,051 | | 5/1997 | Thomson | 705/5 |
| 5,649,186 | * | 7/1997 | Ferguson | 707/10 |
| 5,694,594 | * | 12/1997 | Chang | 707/6 |
| 5,717,925 | * | 2/1998 | Harper et al. | 707/102 |
| 5,761,662 | | 6/1998 | Dasan | 707/10 |
| 5,765,028 | | 6/1998 | Gladden | 706/25 |
| 5,778,367 | * | 7/1998 | Wesinger, Jr. et al. | 707/10 |
| 5,787,424 | | 7/1998 | Hill et al. | 707/6 |
| 5,835,905 | * | 11/1998 | Pirolli et al. | 707/3 |
| 5,842,200 | * | 12/1999 | Agrawal et al. | 707/1 |
| 5,890,149 | * | 3/1999 | Schmonsees | 707/3 |
| 5,913,215 | * | 6/1999 | Rubinstein et al. | 707/10 |
| 5,933,827 | | 8/1999 | Cole et al. | 707/10 |
| 5,943,667 | * | 8/1999 | Aggarwal et al. | 707/3 |
| 5,946,683 | * | 8/1999 | Rastogi et al. | 707/6 |
| 5,983,222 | * | 11/1999 | Morimoto et al. | 707/6 |
| 6,003,029 | * | 12/1999 | Agrawal et al. | 707/7 |
| 6,202,062 | * | 12/1999 | Cameron et al. | 707/3 |

OTHER PUBLICATIONS

Voorhees et al., "Multiple Search Engines in Database Merging", Proc. of the 2nd Annual ACM International Conf. on Digital Libraries 93–102 (1997).*

*Learning Lexis, a Handbook for Modern Research* by Lexis–Nexis.

Manning & Napier Information Services; DR–LINK Quick Start Guide.

* cited by examiner

[PROCESS INFORMATION] 1) THE ENTIRE PROCESS

[1] IN FIG. 1   2) BOX #3 APPLICATION
 —MINING PROFILE DATA
 —MINING (CROSS-REFERENCING) PROFILE DATA AGAINST SUBJECT INFORMATION
 —DYNAMIC SEARCH CAPABILITIES

[2] IN FIG. 1   3) THE PROCESS BETWEEN USER AND WWW SEARCH TOOL

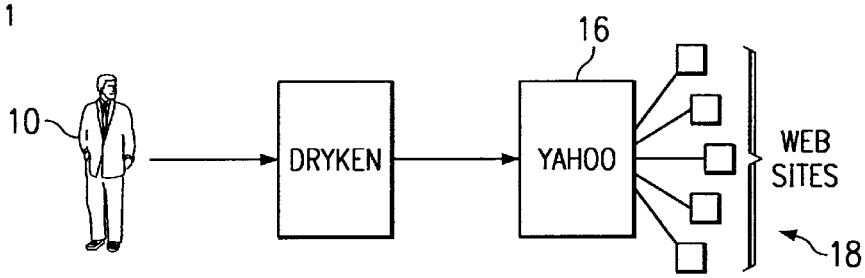

4) BOX #5 APPLICATION
 —DATA MINING SPECIFIC DATABASE INFORMATION

[3] IN FIG. 1   5) THE PROCESS BETWEEN USER AND PROPRIETARY OR OTHER NON-READILY ACCESSIBLE DATABASES

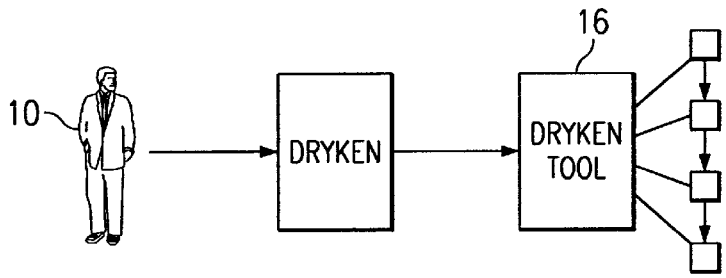

CB. * 6) THE DATA MINING TECHNOLOGY ITSELF
* 7) THE DYNAMIC TRAINING ALGORITHM
 —NEW METHOD

*FIG. 3*

SYSTEM AND METHOD FOR DYNAMIC DATA-MINING AND ON-LINE COMMUNICATION OF CUSTOMIZED INFORMATION

RELATED APPLICATIONS

This application claims benefit of U.S. Provisional Application No. 60/095,308 filed on Aug. 4, 1998. Additionally this application incorporates by reference the prior U.S. Provisional Application No. 60/095,308 filed on Aug. 4, 1998 entitled "Method and System for Dynamic Datamining and On-line Communication of Customized Information" to Ingrid Vanderveldt and U.S. patent application Ser. No. 09/282,392 filed on Mar. 31, 1999 entitled "An Improved Method and System for Training an Artificial Neural Network" to Christopher L. Black.

TECHNICAL FIELD OF THE INVENTION

This invention relates generally to the use of a dynamic search engine and, more particularly, to a dynamic search engine applied to the Internet that allows for customized queries and relevant responses.

BACKGROUND OF THE INVENTION

Current Internet search tools often provide irrelevant data sites or web sites. Often, current search tools provide a score of relevance according to text frequency within a given data site or web page. For example, "termites" and "Tasmania" and "not apples":

- If a web page has several instances of the word "termites" (600 for example), the web page would receive a high relevance score.
- A web page with 600 "termites" and one "Tasmania" would receive a slightly higher score.
- A web page with the above plus "apples" would then receive a slightly lesser score.

Therefore, a score of relevance according to a data site or web page is often based on text or word frequency. Therefore current search tools often provide a list of irrelevant web pages. Furthermore, there is the opportunity for abuse in and associated with the method of the available search tools. Current search tools often provide links that are stale (old data that is no longer at the address of the data site). Existing search tools utilize indices that are compiled in the background continuously. However, with respect to an individual query, a historical result is received. Therefore, the search process involves a large amount of filtering by the individual user.

Therefore, there is a need to more efficiently utilize search tools to overcome irrelevant results. At present, it is desirable to have an efficient method for performing a search which would take into account demographic as well as historical user information to filter irrelevant data from the results from existing search tools.

Furthermore, it is desirable to have a search engine which will evaluate and filter stale data responses from an existing search tool response.

SUMMARY OF THE INVENTION

In accordance with the present invention, a method and system for searching databases in response to a query is provided that substantially eliminates or reduces disadvantages and problems associated with previous methods and systems for searching databases.

More specifically, the present invention provides a system and method for dynamic data-mining and on-line communication of customized information. This method includes the steps of first creating a search-specific profile. This search-specific profile is then input into a data-mining search engine. The data-mining search engine will mine the search-specific profile to determine at least one topic of interest. The at least one topic of interest may comprise a specific and/or related topics to interest. The at least one topic of interest is outputted to at least one search tool. These search tools match the at least one topic of interest to at least one destination data site. The destination data sites (web page) are evaluated to determine if relevant information is present in the destination data site. If relevant information is present at the destination data site, this data site may be presented to a user.

One broad aspect of the present invention includes the coupling of a data-mining search engine to at least one search tool. This data-mining search engine can review and evaluate data sites. Current search tools available may create a massive index of potential data sites. The data-mining engine of the present invention evaluates whether data accumulated by current search tools are relevant to a user and filters out non-relevant information.

The present invention provides an advantage by providing a search engine algorithm that provides fresh (as opposed to stale) links to more highly relevant web pages (data sites) than provided by the current search engines.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein:

FIG. 3 explains the related patent applications to the present invention;

DETAILED DESCRIPTION OF THE INVENTION

Figure 1:
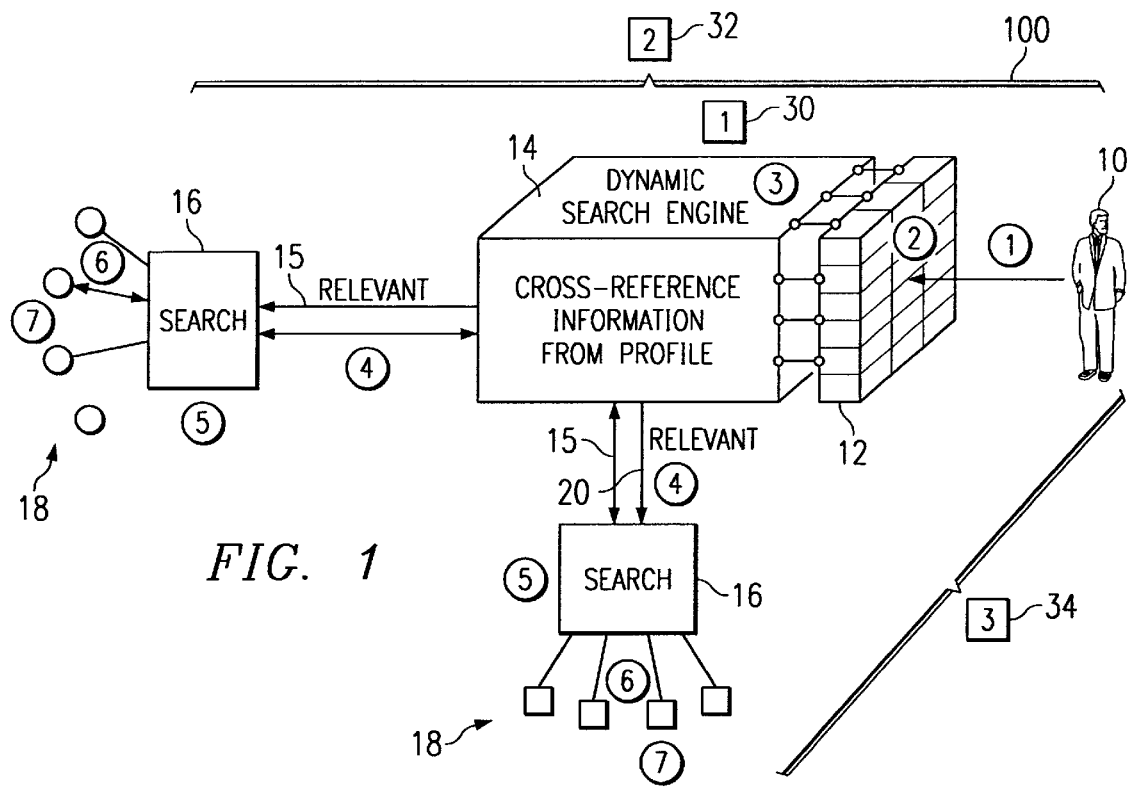
FIG. 1 shows a diagram of the present embodiment of the invention.

Preferred embodiments of the present invention are illustrated in the FIGURES, like numerals being used to refer to like and corresponding parts of the various drawings.

In accordance with the present invention, a method and system for dynamically searching databases in response to a query is provided that substantially eliminates or reduces disadvantages and problems associated with previous methods and systems for searching databases.

More specifically, the present invention provides a system and method for dynamic data-mining and on-line communication of customized information. This method includes the steps of first creating a search-specific profile. This search-specific profile is then input into a data-mining search engine. The data-mining search engine will mine the search-specific profile to determine at least one topic of interest. The at least one topic of interest may comprise a specific and/or related topics to interest. The topic of interest is output to at least one search tool. These search tools match the topic of interest to at least one destination data site. The destination data sites are evaluated to determine if relevant information is present in the destination data site. If relevant information is present, this data site is assigned a relevance score and presented to the user requesting the query.

One broad aspect of the present invention includes the coupling of a data-mining search engine to at least one search tool. This data-mining search engine reviews and evaluates available data and data sites. Current search tools available may create a massive index of potential data sites. The data-mining engine of the present invention evaluates whether the available data accumulated by current search tools are relevant to a user and filters out all non-relevant information, creating a more effective and efficient search engine.

In one embodiment, the present invention includes a web site containing several data-mining tools. These tools fall into two separate categories: a dynamic approach to generating a list of links that are well correlated to a user provided search string using a novel search strategy (e.g., incorporating simple text matching, text associations, synonym and near text matching—to handle misspellings, profile information, a recursive definition of document importance/relevance—important/relevant documents link to other important/relevant—and weighting of the previous factors based upon Artificial Intelligence (A.I.), and stand-alone models (e.g., neural networks and NSET models, as well as others known to those skilled in the art), which would provide useful predictions or estimations (such as described in the U.S. patent application Ser. No. 09/282,392 entitled "An Improved Method and System for Training An Artificial Neural Network" filed Mar. 31, 1999 to Christopher L. Black, hereafter BLACK.

The stand alone models would be created with implementer or user interaction, and could be ever increasing in number, as desired and as data was discovered/licensed/acquired. Eventually, the web site would contain a portal to hundreds of thousands of interesting and useful models.

Neither the search engine nor the models would necessarily be limited to medical information and topics. However, the present invention primarily focuses on healthcare-related applications. The system and method of the present invention need not be limited to such health care database.

The present invention provides a method for data-mining that provides use of many different A.I. models derived for many different applications from many different datasets. The present invention provides the benefit of a neural network training algorithm, genetic algorithms, expert and fuzzy logic systems, decision trees, and other methods known to those skilled in the art applied to any available data.

Secondly, the present invention allows the compact storage, retrieval, and use of relationships and patterns present in many datasets, each made up of very many patterns of examples, each made of several different measurements or values, each requiring several bytes when stored conventionally or explicitly (as in a relational database or a flat file). Single datasets consisting of multiple gigabytes and terabytes of data are routinely being generated, with exabyte datasets looming on the horizon. With the use of multiple modeling techniques (different approaches are appropriate to different applications), models encapsulating and summarizing useful information contained within hundreds or even thousands of these datasets could be stored on a single consumer level personal computer hard drive.

FIG. 1 illustrates one physical implementation of the present invention. The number of servers, interconnections, software modules, and the like would largely be determined by scalability concerns. The web site 12 would consist of a graphical user interface (GUI) to present dynamically generated indexes and forms that allow the user 10 to provide a search profile and submit their search requests or feed inputs into a selected A.I. model. The web site 12 could reside upon a single or on a standard farm of web server machines. Search engine requests 15 would be provided to a single or a farm of search machines 16, which would either query static public or proprietary databases 18/indices of links either pre-created (and continually updated) or licensed from, for example, Yahoo and other link search engines. This static list (formed from data sites 18) would provide a starting point for a dynamic (live) search. Both search machines/machine farms 16 would require extremely high speed access to the Internet or other like data networks.

Data-mining is the process of discovering useful patterns and relationships within data. This is typically accomplished by training and then applying a neural network, or inducing and then applying a decision tree, or applying a genetic algorithm, etc. Once the training aspect of many of the techniques is performed, the result is the data-mining tool (e.g., a trained neural network—into which someone who knows nothing about A.I. can simply input values and receive results).

Data-mining "tools" are discrete and specific. Certain models are appropriate for certain tasks. When explanation of a particular result is important (as in credit approval/rejections), and the available data supports the generation/formulation of rules, an expert or fuzzy logic system might be appropriate. When optimization of a particular quantity is important, a genetic algorithm or another evolutionary algorithm might be more useful. When prediction/estimation is important, the neural network training algorithm might be used.

The Dynamic Search Engine 100 can extract/provide useful information from publicly and freely available databases 18. However, the present invention can do the same with proprietary databases 18.

One embodiment of the present invention incorporates an enhanced version of simple text matching (allowing reduced weight for synonym and possible misspelling matches) at the first level. Associations with profile information provide a second metric of relevance (e.g., certain words and word combinations are found to correlate with interest for people providing certain combinations of search profile factors). The final metric is whether other articles possessing high (normalized) relevance (using all 3 levels—a recursive definition) link to the page in question. If so, then the relevance as established by this metric is high.

The spidering/crawling/roboting starts from the static index found in response to the initial query 15 of databases 18. Data sites included in the index are scanned and assigned relevance using the 3 factors above. Data Sites with high levels of relevance are scanned deeper (links are followed, as well as the links revealed on those subsequent pages) than non-relevant pages. After a maximum number of links have been followed, or the total relevance of pages indexed exceeds a threshold, the search stops and results 20 are returned to user 10, organized by a weighted conglomeration of the 3 factors (generated by a neural network trained upon the user profile and previous searches and relevance results).

For the pre-created models, the present invention also has a page indexing the available canned models that the user could simply choose from. Alternatively, based upon text entered at the dynamic search engine GUI 12, the dynamic search engine could suggest appropriate models, where appropriate (e.g., if user enters blue book, the present invention could return at the top of a list of links, a link to a used car value estimator neural network).

Figure 2:
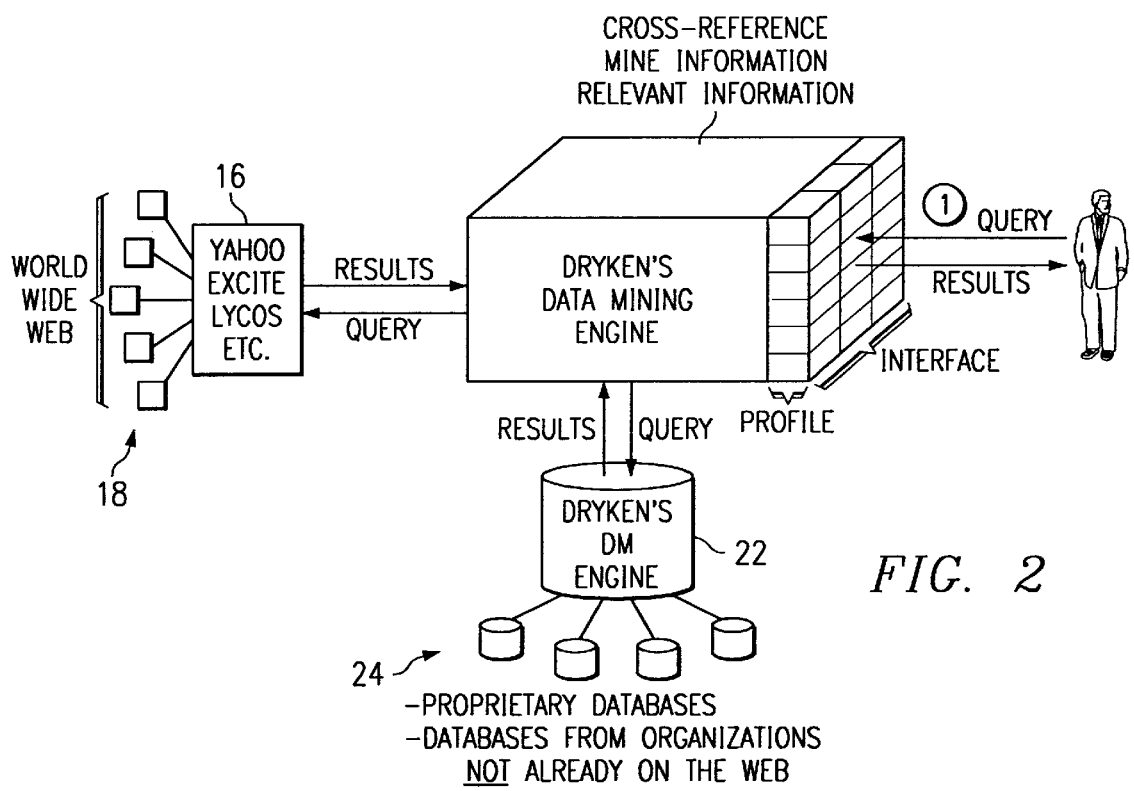
FIG. 2 illustrates an example of operating the present invention.

FIG. 2 illustrates one embodiment of the present invention wherein the search tools comprise a privately licensed search tool 22 accessing privately held databases 24 and publicly available database 18 accessed by search tools provided by YAHOO, EXCITE, LYCOS and other search tools known to those skilled in the art.

FIG. 3 provides an overall description of three processes which occur within FIGS. 1 and 2. Process 30 illustrates the dynamic search engine application which performs the function of mining search profile data as provided from user 10 via GUI 12. Mining or cross referencing the search profile data against subject information includes the dynamic search capabilities of evaluating data sites 18. Process 32 in FIG. 1 illustrates the interaction between a user 10, the dynamic search engine and an available search tool 16, which accesses individual web sites 18. Search tool 16 for each individual may be customized to the protocols associated with each search engine. Process 34 illustrates the process between a user 10, a dynamic search engine of the present invention and a proprietary search engine when the search tool 16 is a proprietary search engine accessing proprietary databases.

Figure 4:
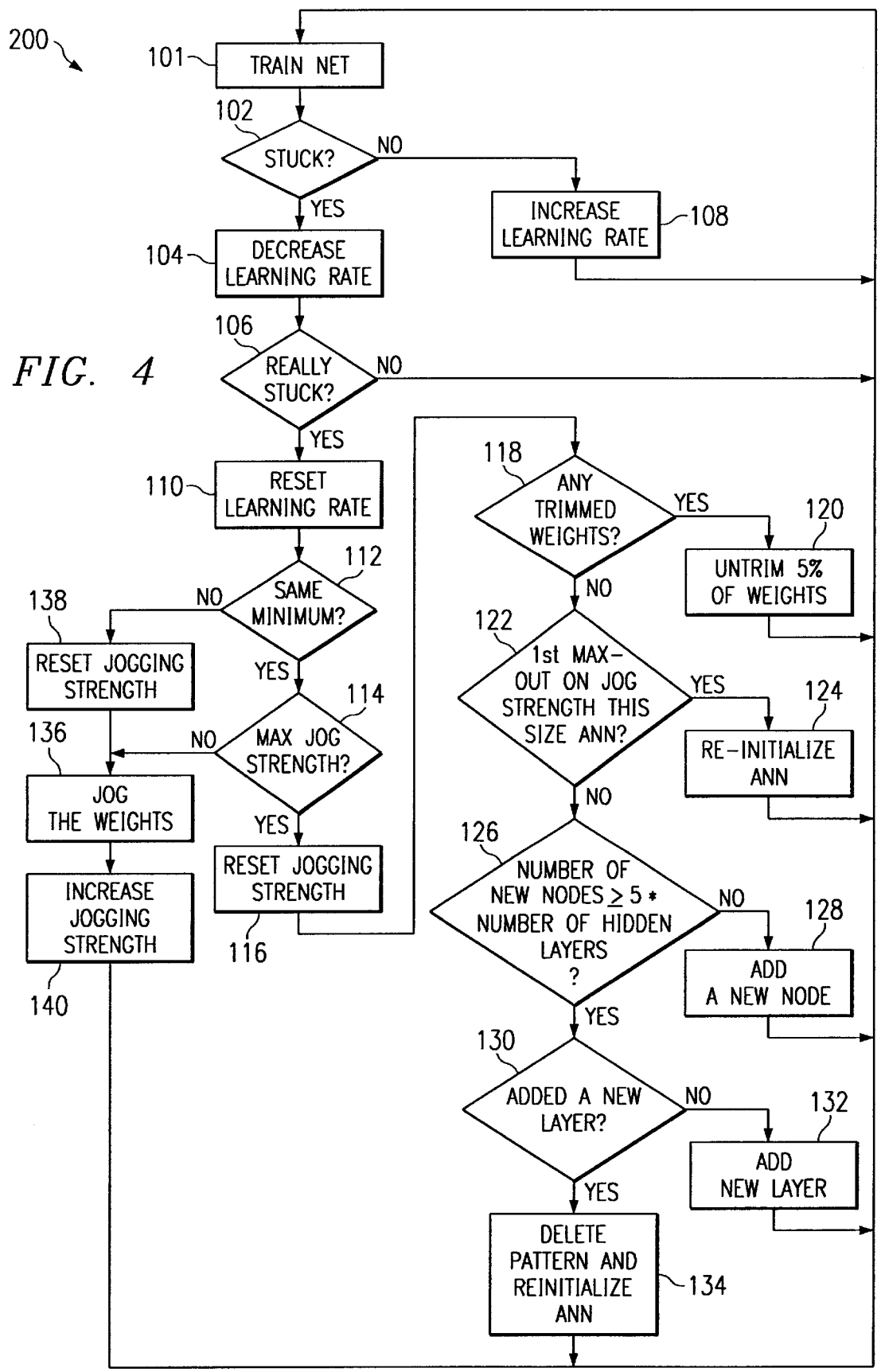
FIG. 4 depicts the use of a training scheme according to the teachings of BLACK.

The improvements to previously existing artificial neural network training methods and systems mentioned in the various embodiments of this invention can occur in conjunction with one another (sometimes even to address the same problem). FIG. 4 demonstrates one way in which the various embodiments of an improved method for training an artificial neural network (ANN) can be implemented and scheduled. FIG. 4 does not demonstrate how representative dataset selection is accomplished, but instead starts at train net block 101 with a representative training dataset already selected.

The training dataset at block 101 can consist initially of one kind of pattern that is randomly selected, depending on whether or not clustering is used. Where clustering takes place, it takes place prior to any other data selection. Assuming, as an example, that clustering has been employed to select twenty training patterns, the ANN can then be randomly initialized, all the parameters can be randomly initialized around zero, and the ANN can take those 20 data patterns and for each one calculate the gradient and multiply the gradient by the initial value of the learning rate. The adaptive learning rate is user-definable, but is usually initially set around unity (1). For each of the representative data patterns initially selected, the training algorithm of this invention calculates the incremental weight step, and after it has been presented all twenty of the data patterns, it will take the sum of all those weight steps. All of the above occurs at train net block 101.

From train net block 101, the training algorithm of this invention goes to step 102 and determines whether the training algorithm is stuck. Being stuck means that the training algorithm took too large a step and the prediction error increased. Once the training algorithm determines that it is stuck at block 104 it decreases the adaptive learning rate by multiplying it by a user-specified value. A typical value is 0.8, which decreases the learning rate by 20%.

If the training algorithm reaches block 102 and determines there has been a decrease in the prediction error (i.e., it is not stuck), the training algorithm proceeds to block 108 and increases the learning rate. The training algorithm returns to block 101 from block 108 to continue training the ANN with a now increased adaptive learning rate.

The training algorithm proceeds to block 106 after decreasing the adaptive learning rate in block 104 and determines whether it has become "really stuck." "Really stuck" means that the adaptive learning rate decreased to some absurdly small value on the order of $10^{-6}$. Such a reduction in the adaptive learning rate can come about as a result of the training algorithm landing in a local minimum in the error surface. The adaptive learning rate will normally attempt to wiggle through whatever fine details are on the error surface to come to a smaller error point However, in the natural concavity or flat spot of a local minimum there is no such finer detail that the training algorithm can wiggle down to. In such a case the adaptive learning rate decreases to an absurdly low number.

If at block 106, the training algorithm determines that it is really stuck (i.e., that the learning rate has iteratively decreased to an absurdly small value), it proceeds to block 110 and resets the adaptive learning rate to its default initial value. In the event that the training algorithm is not really stuck at block 106, it returns to block 101, recalculates the weight steps, and continues training with newly-modified weights. The training algorithm continues through the flow diagram, as discussed above and below.

Once the adaptive learning rate is reset at block 110, the training algorithm proceeds to block 112, where it determines whether the minimum in which it is currently stuck is the same minimum in which it has been stuck in the past (if it has been stuck before). This is because as the training algorithm is learning it will sometimes get out of a local minimum and wind up in the same minima at a future time. If it finds itself stuck in the same minimum, the training algorithm checks, at block 114, whether it has achieved a maximum on the gaussian distribution from which a random value is chosen to perturb the weights (i.e., whether the maximum jog strength has been achieved). The "maximum jog strength" is the maximum value from the gaussian distribution. If the maximum jog strength has been achieved, at block 116 the training algorithm resets the jogging strength.

The jogging strength is reset at block 116 because the problem is not so much that the training algorithm has found itself in a local minimum, but that the ANN is not complicated enough. The training algorithm moves to block 118 and determines whether it has, prior to this point, trimmed any weights. "Trimming weights" means to set those weights to zero and take them out of the training algorithm. The procedure for trimming of weights will be described more fully with respect to FIG. 13 of U.S. Pat. App. No. 09/282,392.

If at step 118 the training algorithm determines that weights have previously been trimmed (i.e., that the weights have been previously randomly affected but the training algorithm still wound up in the same minimum because the network was not complex enough to get any more accuracy out of the mapping), the training algorithm moves to step 120 and untrims 5% of the weights. This means that weights that were previously trimmed are allowed to resume at their previous value, and from this point on they will take part in the training algorithm. The training algorithm returns to step 101 and continues to train as before.

By untrimming 5% of the weights, the training algorithm returns a little more complexity back to the model in hopes of decreasing the prediction error. If prediction error does not decrease, the training algorithm will once again reach a local minimum and the training algorithm will determine once again at block 112 whether it is stuck in the same minimum as before. Note, however, that at block 110 the adaptive learning rate is reset before addressing the complexity issue of untrimming previously trimmed weights, so it takes some iterations through blocks 101, 102, 104, 106 and 110 before getting back to the process of untrimming any more weights. In the event the training algorithm does wind up in the same minimum, the maximum jog strength will not have been reached, since it was previously reset at block 116 in a prior iteration. Instead, the training algorithm will proceed to block 136. At block 136 the weights are jogged, and at block 140 the jogging strength is slightly increased according to a gaussian distribution. Following block 140, the training algorithm proceeds to train net block 101 and continues training.

If in the course of training the training algorithm again reaches the same minimum, the procedure above is repeated. In the event the jog strength once again reaches the maximum level at block 114, the training algorithm resets the jogging strength as previously discussed. If the training algorithm reaches block 118 after several rounds of untrimming weights such that there are no longer any trimmed weights, the training algorithm proceeds along the "no" path to block 122.

At block 122, the training algorithm determines if this is the first time it has maxed out the jog strength on this size ANN. The training algorithm keeps a counter of how many times the jog strength has maxed out with an ANN of a given size. If this is the first time the jog strength has maxed out for the current ANN size, the training algorithm proceeds along the "yes" path to block 124 and completely re-initializes the ANN. All of the weights are re-initialized and the ANN is restarted from scratch. The training algorithm proceeds to block 101 and commences training the net anew. The ANN, however, remains whatever size it was in terms of number of hidden layers and number of nodes when training resumes at train net block 101 with the newly re-initialized weights.

At block 122, if the answer is "no," the training algorithm proceeds along the "no" path to block 126. At block 126 the training algorithm has already maxed out the jog strength more than once for the current size ANN. Block 126 tests to see how many new nodes have been added for the current state of the representative training dataset. The training algorithm determines if the number of new nodes added for this size ANN is greater than or equal to five times the number of hidden layers in the ANN. If the number of new nodes added is not equal to or in excess of 5 times the number of hidden layers in the ANN, the training algorithm proceeds along the "no" path to block 128. At block 128, a new node is added according to the procedures discussed above and the training algorithm proceeds to train net block 101 to continue training the artificial neural network with the addition of the new node. The training algorithm of this invention will then proceed as discussed above.

If the number of new nodes added exceeds five times the number of hidden layers, the training algorithm proceeds along the "yes" path from block 126 to block 130. At block 130, the training algorithm determines whether a new layer has previously been added to the ANN. If the training algorithm has not previously added a new layer (since the last time it added a training data pattern), it proceeds along the "no" path to block 132 and adds a new layer to the artificial neural network. The training algorithm then proceeds to block 101 and continues to train the net with the newly added layer. If a new layer has been added since the last training pattern was added, the training algorithm proceeds along the "yes" path to block 134.

If a new layer has previously been added, it means that the training algorithm has previously added a number of nodes, has jogged the weights a number of times, and has added a layer because of the new training data pattern that has been added in the previous iteration. The training algorithm decides by going to block 134 that the training data pattern added recently is an out-lier and does not fit in with the other patterns that the neural network recognizes. In such a case, at block 134 the training algorithm removes that training data pattern from the representative training dataset and also removes it from the larger pool of data records from which the training algorithm is automatically selecting the training dataset. The training algorithm once again proceeds to train net block 101 and continues to train the network without the deleted data pattern.

Returning to block 112, if the training algorithm decides that it has not fallen into the same minimum, it proceeds along the "no" path to block 138. At block 138, the training algorithm resets the jogging strength to give only a small random perturbation to the weights and parameters in an attempt to extricate itself from a new local minimum. If the training algorithm reaches a new local minima, we want the training algorithm to start over again. It is desirable to reset the jogging strength to give a small random perturbation to the weights and parameters. The intent is to start off with a small perturbation and see if it is sufficient to extricate the training algorithm from the new local minimum.

After resetting the jogging strength in block 138, the training algorithm proceeds to block 136 and jogs the weights. The training algorithm proceeds to block 140, increases the jogging strength, and proceeds to block 101 and trains the net with the newly increased jogging strength.

FIG. 4 thus gives us an overview in operation of the various embodiments of the training algorithm of BLACK.

Figure 5:
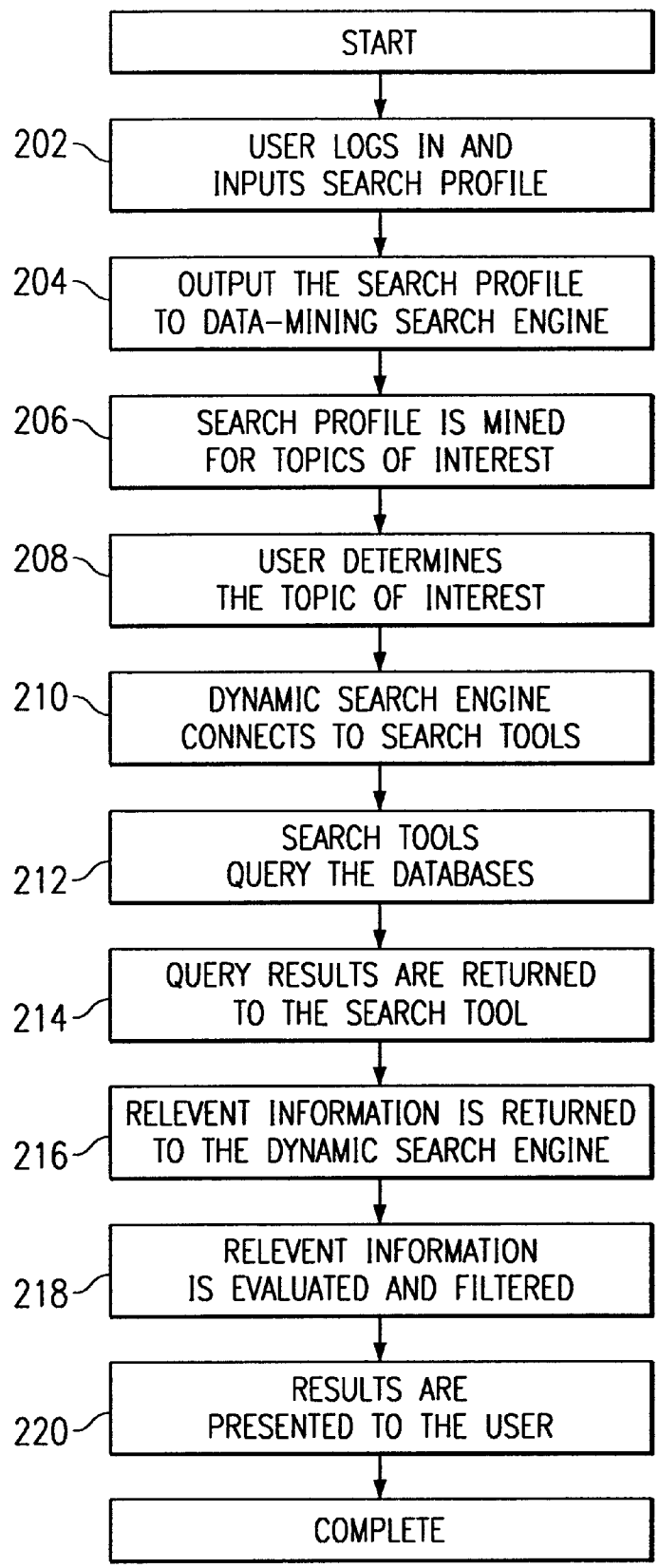
FIG. 5 details a flow chart illustrating the method of the present invention.

FIG. 5 provides a flow chart of the present invention illustrating one method of dynamic datamining.

At step 202, user 10 arrives at a GUI 12 and logs on. Once logged on, the system queries the user for their specific search profile.

Once the user has entered the data, the specific profile is output to data-mining search engine 12 at step 204.

In step 206, the dynamic search engine 100 data mines the specific profile to determine what other related topics of interest would be relevant and of greatest interest to the user 10.

The information is categorized so that it can be transferred to both existing and future search engines.

These related topics of interest are fed back to user 10. In step 208 user 10 then determines the topic outputs and the specific and related topics to be researched. The dynamic search engine then connects existing public and proprietary search tools 16.

At step 210, the information is transferred, over the Internet, or other like communication pathway, to other sites and/or licensed search tools (Yahoo, Lycos or others known to those skilled in the art) to find information matching the search query 15.

At step 212, information is gathered from the search destination site(s) pertaining to the request.

At step 214, information is sent, from the search engine (Yahoo, etc.) to the dynamic search engine. Relevant information is gathered from the destination databases.

The information is sent back to the data-mining search engine 14 at which point the information is cross-referenced to the user's profile. Depending on the profile, the presentation will rate, weigh and organize each search to present the most relevant and related topics of interest.

The information will be presented back to the user in a way such as:

The most relevant topics/areas of interest: #1–10

The most related topics/area of Interest: #1–10

This information will include subjects such as areas of interest that have been shown to have a strong correlation and/or relationship to the specific topic of interest.

Once the user has received the information, they will be asked if they would like to see more information. Each time the user requests additional information, it will be presented subsequent to the most recent, most relevant, information previously presented.

Over time, the profile information database will continue to grow and become more intelligent. Therefore, each subsequent search will become more intelligent and relevant to the previous user. This data will continue to collect in a profile database located within Dynamic search engine 14. Over time, one can monitor the searches, and rate each search a success or failure (or some degree of one or the other), to then optimize with Artificial Neural Nets and Genetic algorithms, or other empirical techniques used in conducting the search.

The Dynamic search engine becomes an intelligent agent that specifically pulls back better (and more recent—also implying more thorough) results than the static search engines that require more user information. Results are specifically searched for with user needs expressed prior to the search, resulting in explicitly tailored searches to a user request.

One embodiment of the present invention provides for a multi-component tool, with six main interacting components—Web servers, Highspeed Internet Connections, Web pages, Health-related Databases, Database Query and Responses Scripts/Code, and the Dynamic Internet Search Scripts/Code.

The web servers are the computer equipment, operating systems, and communications software that will contain and execute the web pages, (GUI) 2 and Dynamic search engine 14. The equipment may also contain the databases, provide highspeed Internet connections, and perform the database 18 and Internet searches. This equipment may be configured from off-the-shelf workstations, peripherals, and software. Initially, only one system must be configured. However, as use grows a search response-time per user can be estimated (and a scalability strategy developed). This will enable projection of the number of servers necessary per user. Estimates may be arrived from data provided by similar web service companies.

The communication pathways, Highspeed Internet connections, consist of T1s, T3s, or other connections known to those skilled in the art. Those connections provide wide-bandwidth communication to and from the entire Internet, and any associated equipment which is not considered a part of the web server. As with the web servers, the amount of necessary bandwidth will be a function of number of concurrent users.

Web pages (GUI) 12 present search prompts and results via the Internet to user 10 and define the interface to the system of the present invention to the user.

The web pages define the format of the query pages and search result pages. The query pages must have multiple forms/options to allow flexibility in searching (which databases to query, simple/Boolean forms, whether to search the Internet, how deep/long to search the Internet, etc.). The search result pages will take multiple forms, depending on the specified request, but will include relevance scores, titles and links, and summaries, much as resulting from internet search engine requests. For internet search results, links would lead to web pages. For other database results, the links would lead to graphical/textual reports for each "hit."

The present invention may utilize databases containing licensed and public domain data. This component includes only bare-data and "pre-processing" thereof. Data-mining (e.g., a hypothetical diagnostic tool "what illness you probably have" based upon a neural network trained from a symptom/illness database) and analysis are considered part of the following component and its development.

The database query scripts direct the simple searching and querying of the databases, access custom data-mining solutions developed for some of the databases, and allow visualization for exploration of the databases. These scripts are also responsible for returning the results of searches in the HTML format design.

Each data-mining tool to be implemented may be custom developed for the appropriate database. Such tools will continue to be added, as appropriate data becomes available to the present invention, even after deployment of the system.

These scripts, based upon the text-based query, and possibly a demographic and historical search profile, perform a "blind" an "dynamic" search of world wide web pages, returning those deemed most "relevant." This search is blind, in that prior to the search, no index (such as those compiled and used by existing search engines) has been generated. This search will be dynamic, in that contrary to the manner in which other search engines return their results (based upon a pre-compiled though continuously updated index) the web is searched anew with each request.

Based upon the top N (adjustable by the user) results returned by the static search, the dynamic search would assign a relevance to each page. The dynamic search would then proceed to "spider" to each of the links contained in each page, according to a function of the relevance. The search would spider several levels beyond extremely relevant pages, and none beyond irrelevant pages. As listed below, initially the relevance function would consist of simple text matching and counting of keyword occurrences (as do the other search engines).

Based upon a historical profile of search successes and failures as well as demographic/personal data, technologies from artificial intelligence and other fields will optimize the relevance rating function. The more the tool is used (especially by a particular user) the better it will function at obtaining the desired information earlier in a search. The user will not have to be a computer or information scientist. The user will just be aware that with the same input the user might give a static search engine, the present invention finds more relevant, more recent and more thorough results than any other search engines.

A method and system for dynamically searching databases in response to a query is provided by the present invention. More specifically, a system and method for dynamic data-mining and on-line communication of customized information is provided. This method includes the steps of first creating a search-specific profile. This search-specific profile is then input into a data-mining search engine. The data-mining search engine will mine the search-specific profile to determine topic of interests. These topics of interest are output to at least one search tool. These search tools match the topics of interest to at least one destination data site wherein the destination data sites are evaluated to determine if relevant information is present in the destination data site. Relevant information is filtered and presented to the user making the inquiry.

The present invention provides an advantage by providing a search engine algorithm that provides fresh (as opposed to stale) links to more highly relevant web pages (data sites) than provided by the current search engines.

Although the present invention has been described in detail, it should be understood that various changes, substitutions and alterations can be made hereto without departing from the spirit and scope of the invention as described by the appended claims.

What is claimed is:

1. A method for assigning relevance of inter-linked objects within a database using an artificial neural network ("ANN") to provide a customized search tool for a user, comprising:

searching said database for one or more inter-linked objects satisfying at least one or more relevance metrics;

assigning, with said ANN, a weight to each of said inter-linked objects; and identifying to said user each of said one or more weighted inter-linked objects having an assigned weight greater than some predetermined threshold value.

2. The method of claim 1, further comprising the step of training said ANN to assign said weight to each of said inter-linked objects based on said user's historical search preferences.

3. The method of claim 1, wherein said database is a partially or a fully indexed database.

4. The method of claim 1, wherein said inter-linked objects are data sites, or links to data sites.

5. The method of claim 1, wherein said relevance metrics are satisfied with reference to a user text query.

6. The method of claim 5, wherein said one or more relevance metrics comprise a first relevance metric, a second relevance metric and a third relevance metric.

7. The method of claim 5, wherein said first metric is based on frequency of common word occurrences between said text query and said inter-linked objects, wherein said second metric is based upon associations between a set of user profile information and said inter-linked objects, and wherein said third relevance metric is based upon whether inter-linked objects having assigned relevance metrics are inter-linked with each other.

8. The method of claim 1, wherein said weight comprises a sum of individual weights assigned by said ANN for each of said relevance metrics satisfied by each of said inter-linked objects.

9. The method of claim 1, wherein said identifying step further comprises organizing by weight said weighted inter-linked objects having an assigned weight greater than some predetermined threshold value.

10. A method for dynamically searching a database, in response to a textual query, to provide a customized search tool for a user, comprising the steps of:

(a) comparing said textual query against said database's existing static database index to identify, using an Artificial Neural Network ("ANN"), a first set of one or more relevant inter-linked objects using one or more relevance metrics;

(b) comparing said textual query against one or more secondary inter-linked objects linked to by one or more of said inter-linked objects in said first set to identify, using said ANN, a second set of relevant inter-linked objects using said one or more relevance metrics; and (c) repeating step (b) for each subsequent identified set of relevant inter-linked objects a preset number of times.

11. The method of claim 10, wherein steps (a) and (b) further comprise the steps of:

searching said existing database index or said one or more secondary inter-linked objects, respectively, for one or more inter-linked objects satisfying at least one of said one or more relevance metrics;

assigning, by said ANN, a weight to each of said inter-linked objects to represent its relevance; and populating said first set, or said second set with each of said one or more weighted inter-linked objects having an assigned weight greater than some predetermined threshold value.

12. The method of claim 11, further comprising the step of training said ANN to assign said weight to each of said inter-linked objects based on said user's historical search preferences.

13. The method of claim 11, further comprising the step of identifying to a user each of said one or more weighted inter-linked objects having an assigned weight greater than some predetermined threshold value.

14. The method of claim 10, wherein said database is a partially or a fully indexed database.

15. The method of claim 10, wherein said first set and said second set of inter-linked objects comprise sets of data sites, or sets of links to data sites.

16. The method of claim 10, wherein said one or more relevance metrics comprise a first relevance metric, a second relevance metric and a third relevance metric.

17. The method of claim 16, wherein said first metric is based on frequency of common word occurrences between said text query and said inter-linked objects, wherein said second metric is based upon associations between a set of user profile information and said inter-linked objects, and wherein said third relevance metric is based upon whether inter-linked objects having assigned relevance metrics are inter-linked with each other.

18. The method of claim 17, wherein said user profile information comprises demographic information provided or inferred from the said user's responses to a registration questionnaire, augmented by explicit or implicit user feedback.

19. The method of claim 10, wherein said weight comprises a sum of individual weights assigned by said ANN for each of said relevance metrics satisfied by each of said inter-linked objects.

20. The method of claim 10, wherein said identifying step further comprises organizing by weight said weighted inter-linked objects having an assigned weight greater than some predetermined threshold value.

21. The method of claim 10, wherein said textual query is user supplied.

22. The method of claim 10, wherein said relevant inter-linked objects are links to predictive models for modeling the subject matter of said textual query.

23. The method of claim 22, wherein said predictive models comprise models for prediction of stock market future prices, medical condition diagnosis, wine selection to accompany a dinner entree, cross sale, add-on sale and other e-commerce product recommendation applications.

24. The method of claim 10, wherein said database comprises links to partially indexed HTML-formatted documents available on the internet and wherein said index is an existing 'static' web search index.

25. A system for assigning relevance of inter-linked objects within a database using an artificial neural network ("ANN") to provide a customized search tool for a user, comprising:

instructions for searching said database for one or more inter-linked objects satisfying at least one of one or more relevance metrics;

instructions for assigning, with said ANN, a weight to each of said inter-linked objects; and instructions for identifying to said user each of said one or more weighted inter-linked objects having an assigned weight greater than some predetermined threshold value.

26. The system of claim 25, further comprising instructions for training said ANN to assign said weight to each of said inter-linked objects based on said user's historical search preferences.

27. The system of claim 25, wherein said database is a partially or a fully indexed database.

28. The system of claim 25, wherein said inter-linked objects are data sites, or links to data sites.

29. The system of claim 25, wherein said relevance metrics are satisfied with reference to a user text query.

30. The system of claim 29, wherein said one or more relevance metrics comprise a first relevance metric, a second relevance metric and a third relevance metric.

31. The system of claim 29, wherein said first metric is based on frequency of common word occurrences between said text query and said inter-linked objects, wherein said second metric is based upon associations between a set of user profile information and said inter-linked objects, and wherein said third relevance metric is based upon whether inter-linked objects having assigned relevance metrics are inter-linked with each other.

32. The system of claim 25, wherein said weight comprises a sum of individual weights assigned by said ANN for each of said relevance metrics satisfied by each of said inter-linked objects.

33. The system of claim 25, wherein said instructions for identifying further comprise instructions for organizing by weight said weighted inter-linked objects having an assigned weight greater than some predetermined threshold value.

* * * * *